Oct. 28, 1958
N. DANIELSON
2,857,944
POWER TOOL TABLE
Filed July 10, 1956
3 Sheets—Sheet 2
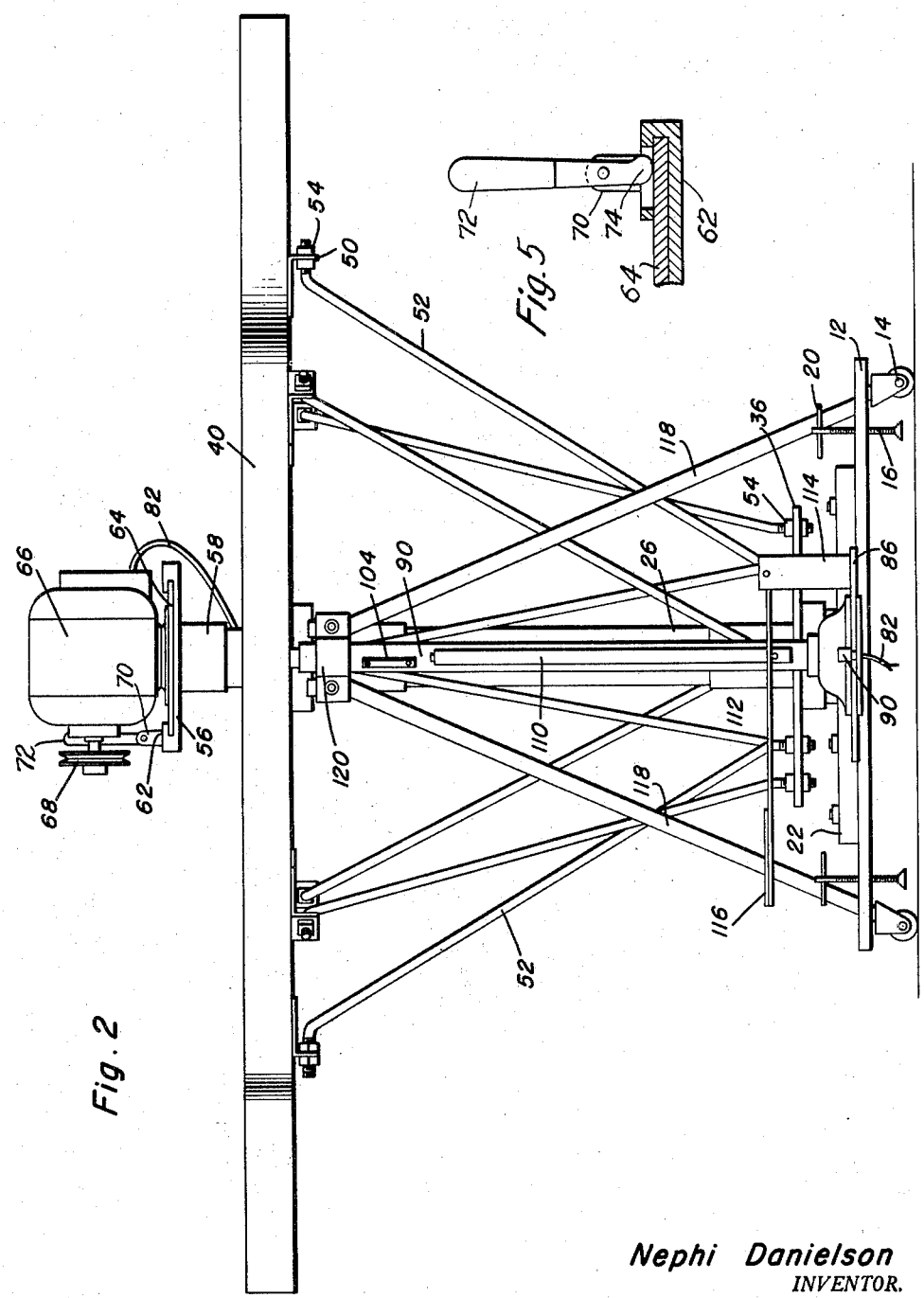
Nephi Danielson
INVENTOR.

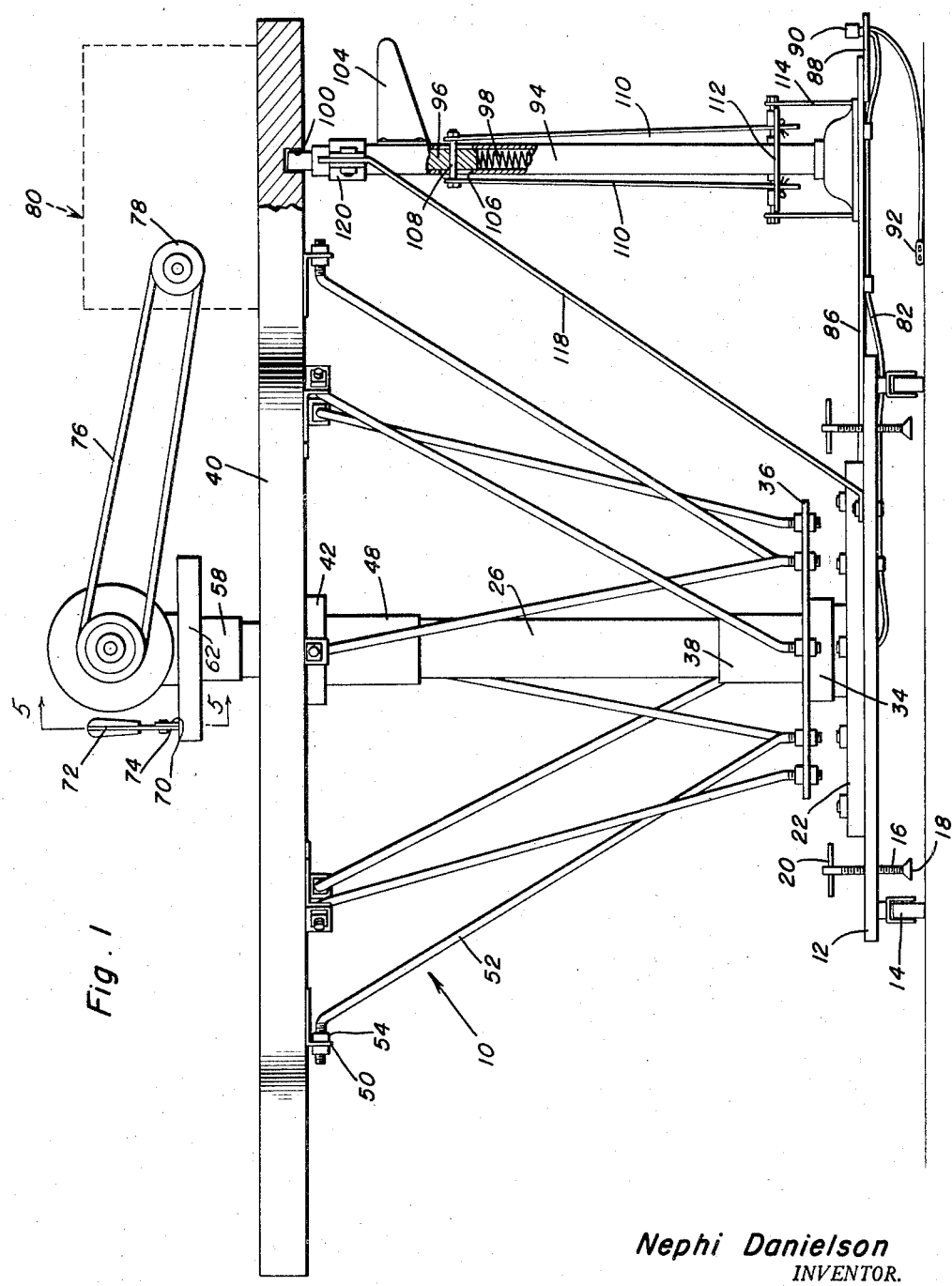

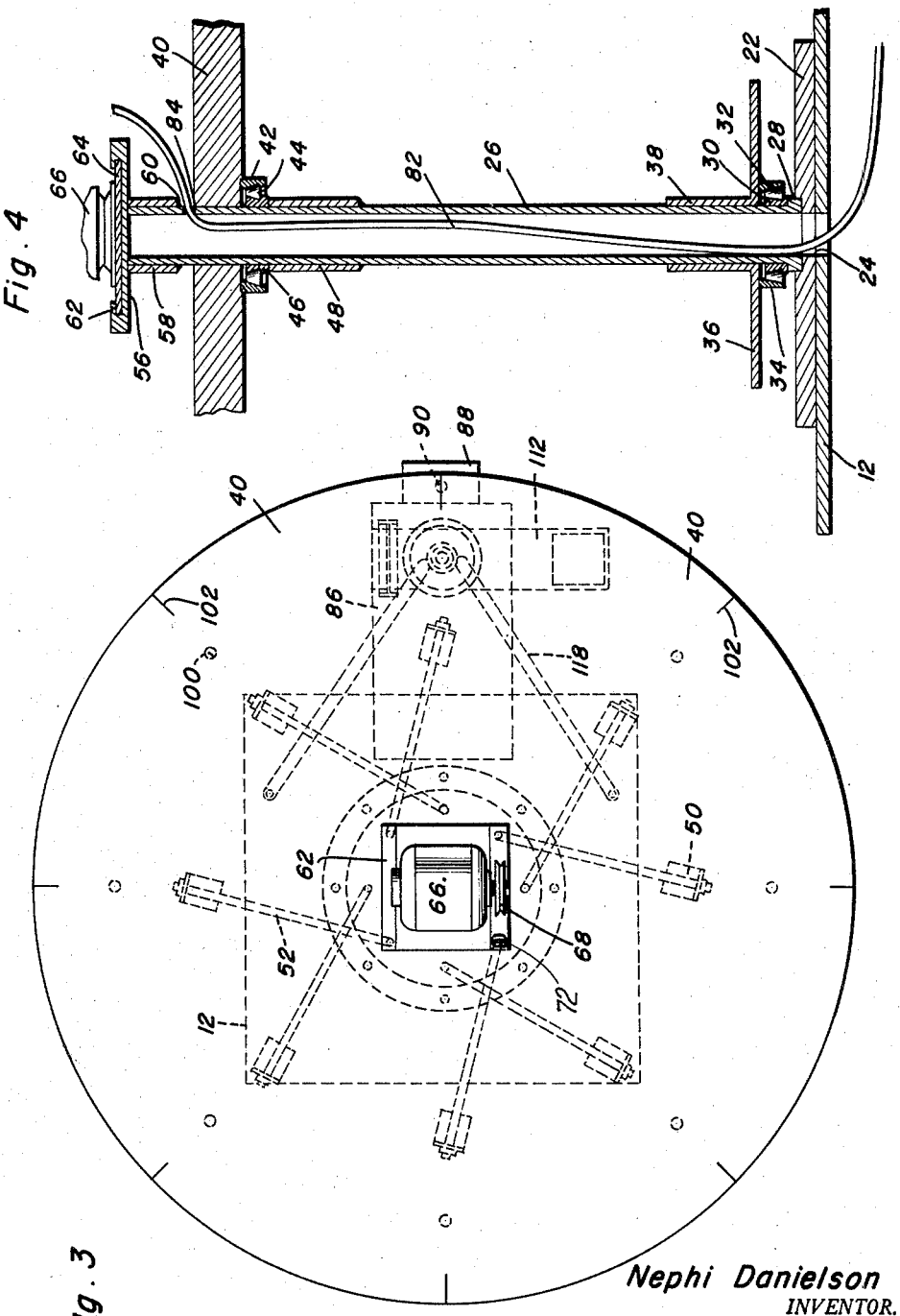

United States Patent Office 2,857,944
Patented Oct. 28, 1958

2,857,944

POWER TOOL TABLE

Nephi Danielson, Butte, Mont.

Application July 10, 1956, Serial No. 597,029

2 Claims. (Cl. 144—1)

This invention generally relates to a supporting table for a plurality of power tools and is specifically adapted for woodworking tools whereby a single motor may be provided in an elevated, out-of-the-way position for driving one of the power tools with the tools being disposed on a rotatable table top with means being provided for locking the table top in a desired angular position for aligning the pulley on the particularly tool with the pulley on the motor whereby a V-belt may interconnect the two for driving the particular tool being employed at a particular time.

The primary object of the present invention is to provide a combination type of woodworking device incorporating a plurality of tools disposed on a circular table top in circumferentially spaced relation with a motor being disposed in stationary position in elevated relation to the table top so that the motor may be employed for selectively driving the power tools.

Another object of the present invention is to provide a supporting table in accordance with the preceding objects in which said operated means and indicating means is provided for indicating the position of the table top and providing means for selectively locking the table top in adjusted position.

A further object of the present invention is to provide a supporting table in accordance with the preceding objects in which a foot operated switch is provided for selectively operating the motor thereby giving accurate control to the power tool being employed.

Yet other objects of the present invention will reside in its rigidity of construction, simplicity in operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the power tool table of the present invention with portions thereof broken away for illustrating certain details of construction and illustrating one of a plurality of power tools in phantom;

Figure 2 is a front elevational view of the construction of Figure 1 illustrating the relationships of the various elements of the invention;

Figure 3 is a plan view of the construction of Figure 1;

Figure 4 is a detailed vertical sectional view of the central hollow post illustrating the supporting bearings for the table top and the brace annular ring; and, Figure 5 is a vertical sectional view taken along line 5—5 in Figure 1, showing the cam for locking the motor platform in place.

Referring now specifically to the drawings, the numeral 10 generally designates the power tool table of the present invention including an enlarged base 12 which may be square and provided with caster support wheels 14 at each corner thereof together with leveling and anchoring support screws 16 having abutments 18 on the lower ends and two handles 20 on the upper ends for leveling and supporting the base 12 in an end position. A circular reinforcing plate 22 is provided on the upper surface of the base 12 and both the base 12 and the plate 22 are provided with a central aperture 24 therein which is in communication with the interior of a vertically disposed and elongated tubular post 26 which is rigid with the plate 22 and secured thereto as by welding 28. At the lower end of the post 26 is provided an inner bearing race 30 engaged by tapered roller bearings 32 which engage with an outer bearing race 34 on the lower surface of a plate 36 rotatably supported on the post 26 and including a cylindrical sleeve 38 forming a sleeve tight bearing and guide for the circular plate 36 which is for a purpose described hereinafter.

Adjacent to but spaced below the upper end of the post 26 is mounted an enlarged circular table top 40 having an outer bearing race 42 connected to the undersurface thereof with the bearing race 42 being in engagement with upwardly tapering bearings 44 which are in engagement with an inner bearing race 46 at the upper end of a reinforcement sleeve 48 on the tubular post 26 thereby effectively rotatably supporting the table top 40.

In spaced relation to the center of the table top 40 is a plurality of depending brackets 50 to which in connected one end of an upwardly and downwardly extending brace 52. The lower end of the braces 52 are connected to the plate 36 in the same manner as the upper ends thereof are connected to the brackets 50, that is by the employment of a pair of screw-threaded nuts 54 engaging on opposite sides of the plate 36 or the bracket 50, respectively, thereby effectively rigidifying the table top 40 and providing rotatable support therefor from both the upper and lower ends of the post 26 whereby a tool of relatively heavy weight may be supported on the table top 40.

The upper end of the post 26 extends above the table top 40 and terminates in a horizontally disposed platform 56 having a rigid depending sleeve 58 secured to the platform 56 and the tubular post 26 as by welding 60. Opposite edges of the platform 56 are inturned as designated by the numeral 62 for overlying engagement with the edges of the base plate 64 for an electric motor 66 with the electric motor 66 having a driving V-belt pulley 68 supported thereon. Disposed at one end of the inturned edges 62 is an upstanding lug 70 having a handle 72 pivoted thereon with the lower end of the handle 72 terminating in a cam 74 for selective frictional locking engagement with the base plate 64 wherein the position of the motor 66 may be varied sufficiently to vary the tension of a V-belt 76. The V-belt 76 also encircles a driven V-belt pulley 78 on the power tool which is schematically illustrated and generally designated by the numeral 80.

As illustrated in Figure 4, the post 26 is hollow for receiving an electrical conductor 82 which extends outwardly through an opening 84 above the table top 40 and is connected to the motor 66 in the usual manner. The lower end of the conductor 82 extends outwardly through the apertures 24 and in underlying relation to the base plate 12 and a laterally extending bracket plate 86 having an extension 88 thereon for supporting a foot switch 90 in the conductor 82 for controlling the supply of energy to the motor 66 from a male plug 92 on the free end of the conductor 82 for insertion into a conventional female electric outlet (not shown).

Extending upwardly from the upper surface of the laterally extending bracket 86 is an upstanding hollow cylindrical member 94 having a plunger slidably mounted in the upper end thereof with the plunger being designated by the numeral 96 and normally projecting above the upper end of the tubular member 94 which terminates adjacent the bottom surface of the table top 40. A compression coil spring 98 is provided under the plunger 96 for urging the plunger 96 outwardly of the hollow member 94. Disposed in the undersurface of the table top 40 is a plurality of circumferentially spaced sockets 100 with a socket 100 being disposed at each work position where a power tool 80 is supported and the upper surface of the table top 40 is provided with distinguishable indicia such as a mark or groove 102 in alignment with each socket 100 so that an outwardly extending flag or projecting plate 104 may be aligned with the indicia 102 thereby indicating that the plunger 96 is in alignment with the socket 100. The upstanding hollow member 94 is provided with diametrically opposed vertical slots 106 for receiving a transverse member 108 rigidly connected to the plunger 96. The outer ends of the transverse member 108 are connected to a pair of links 110 which extend downwardly and are connected to an elongated foot pedal 112 having one end thereof pivotally attached to a pair of upstanding brackets 114 and the other end thereof provided with a foot pressure area 116 wherein the links 110 are connected to the pedal 112 so that pivotal movement of the pedal 112 will lower the plunger 96 for disengagement from the sockets 100 to permit freedom of rotation of the table top 40. A pair of inwardly extending braces 118 are connected to a clamp member 120 adjacent the upper end of the upstanding tubular member 94 and at their other end are connected to the base 12 for rigidifying the tubular member 94.

In practical operation of the invention, the device may be moved to any desired location by employing the caster rollers 14 after which the leveling and anchoring screws 16 may be operated to rigidly support the table top 40 in the desired position. The table top 40 may be rotated to any desired position as indicated by the indicia 102 and flag 104 by depressing the foot pedal 112 by exerting pressure on the foot pressure area 116 thereby disengaging the plunger from the sockets 100 and permitting freedom of rotation of the table top 40. When the desired position has been reached, the foot pedal is released thereby positively locking the table top 40 in position. The V-belt 76 may be connected with the driven pulley 78 on the power tool 80 and also the drive pulley 68 on the motor 66 after which the motor 66 may be adjusted for properly tensioning the belt 76 and permitting operation of the power tool 80 in the desired manner. The foot switch 90 may be operated for controlling the motor 66 for controlling the operation of the power tool 80. The present device permits the use of a single motor mounted in an out-of-the-way position for a plurality of power tools thereby providing a combination device with the power tool being mounted in such a way that they will be readily accessible but still disposed in a compact relation whereby the table top 40 and other portions of the invention may be constructed of wood and other inexpensive materials.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A supporting table for a plurality of power tools comprising a base, a central upstanding post rigidly supported on said base, a circular table top rotatably supported on said post adjacent the upper end, said table top having a plurality of circumferentially spaced sockets in the undersurface thereof, means selectively engageable with said sockets for releasably locking the table top in angularly adjusted position, said central post projecting above said table top, a platform on the upper end of said post for adjustably supporting a motor for driving one of a plurality of tools mounted in circumferentially spaced relation on the table top, said means for engaging said sockets including an upstanding hollow member mounted on said base in underlying relation to the socket, a plunger slidably mounted in said hollow member, spring means urging said plunger into engagement with the sockets, and a foot pedal operated mechanism for retracting said plunger for permitting rotation of said table top, said table top being provided with distinguishable indicia at each work position for indicating the position of the socket, a projecting flag on said hollow member for alignment with the indicia for properly positioning the plunger and socket for interlocking engagement.

2. A supporting table for a plurality of power tools comprising a base, a central upstanding post rigidly supported on said base, a circular table top rotatably supported on said post adjacent the upper end, said table top having a plurality of circumferentially spaced sockets in the undersurface thereof, means selectively engageable with said sockets for releasably locking the table top in angularly adjusted position, said central post projecting above said table top, a platform on the upper end of said post for adjustably supporting a motor for driving one of a plurality of tools mounted in circumferentially spaced relation on the table top, said means for engaging said sockets including an upstanding hollow member mounted on said base in underlying relation to the socket, a plunger slidably mounted in said hollow member, spring means urging said plunger into engagement with the sockets, a foot pedal operated mechanism for retracting said plunger for permitting rotation of said table top, said table top being provided with distinguishable indicia at each work position for indicating the position of the socket, a projecting flag on said hollow member for alignment with the indicia for properly positioning the plunger and socket for interlocking engagement, said hollow member being provided with a pair of braces extending from the upper end thereof to the base for rigidifying the upper end of the hollow member.

References Cited in the file of this patent

UNITED STATES PATENTS

| | | |
|---|---|---|
| 1,506,154 | Berthelsen | Aug. 26, 1924 |
| 1,587,734 | Jacobs | June 8, 1926 |
| 1,600,619 | Briere | Sept. 21, 1926 |
| 1,801,735 | Glatt | Apr. 21, 1931 |
| 1,852,324 | Long | Apr. 5, 1932 |
| 1,940,158 | Vancil | Dec. 19, 1933 |
| 2,058,680 | Gorsline | Oct. 27, 1936 |
| 2,486,494 | Rice | Nov. 1, 1949 |
| 2,567,127 | Shoffner | Sept. 4, 1951 |
| 2,603,250 | Williams | July 15, 1952 |
| 2,743,746 | Davison | May 1, 1956 |